United States Patent [19]
DeGroot, Jr.

[11] Patent Number: 5,990,223
[45] Date of Patent: Nov. 23, 1999

[54] CONTROL OF RHEOLOGICAL AND MECHANICAL PROPERTIES OF SILICONE ELASTOMERS CONTAINING SILICA FILLER

[75] Inventor: Jon Vierling DeGroot, Jr., Midland, Mich.

[73] Assignee: Dow Corning Corporation, Midland, Mich.

[21] Appl. No.: 09/024,279

[22] Filed: Feb. 17, 1998

[51] Int. Cl.$^6$ ....................................................... C08K 3/00
[52] U.S. Cl. ........................................... 524/492; 524/493
[58] Field of Search ....................................... 524/492, 493

[56] References Cited

U.S. PATENT DOCUMENTS

| | | | |
|---|---|---|---|
| 4,251,281 | 2/1981 | Machurat et al. | 106/288 |
| 5,367,260 | 11/1994 | Dechene et al. | 324/307 |
| 5,652,376 | 7/1997 | Deleuw et al. | 73/54.35 |
| 5,670,560 | 9/1997 | Lower et al. | 523/212 |

OTHER PUBLICATIONS

"The Journal of the American Chemical Society," vol. 60, p. 309 (Feb., 1938).
"Rubber Chemistry and Technology," vol. 68, p. 59 (Mar.–Apr., 1995).
"J. Soc. Chem. Ind., London," vol. 69, p. 134 (1950).
"Rubber Chemistry and Technology," vol. 66, pp. 48–60 (1993).

*Primary Examiner*—Edward J. Cain
*Attorney, Agent, or Firm*—Jennifer S. Warren

[57] ABSTRACT

A method of controlling silica reinforcement in a curable silicone composition having a desired property related to the silica reinforcement comprising adding to the curable silicone composition a volume fraction of reinforcing silica filler sufficient to provide the desired property, where the volume fraction is determined by use of a regression analysis equation relating the volume fraction, Carman surface area (CSA), and Burnauer-Emmet-Teller surface area (BET) of the reinforcing silica filler to the desired property.

14 Claims, No Drawings

CONTROL OF RHEOLOGICAL AND MECHANICAL PROPERTIES OF SILICONE ELASTOMERS CONTAINING SILICA FILLER

BACKGROUND OF THE INVENTION

This invention relates to a method of controlling silica reinforcement in a curable silicone composition having a desired property related to the silica reinforcement, the method comprising adding to the curable silicone composition a volume fraction of reinforcing silica filler sufficient to provide the desired property, where the volume fraction is determined by use of a regression analysis equation relating the volume fraction, Carman surface area (CSA), and Bumauer-Emmet-Teller surface area (BET surface area) of the reinforcing silica filler to the desired property.

It is recognized in the art of elastomer reinforcement that filler properties play a major role in determining elastomer Theological and mechanical properties. In general, viscosity or plasticity of the uncured elastomer, and yield, stress, durometer, and modulus of cured elastomers increase with increasing BET surface area. An important reinforcing filler used in silicone elastomers is amorphous silica. Two types of amorphous silicas are used, fumed and precipitated, with fumed silica use predominating. Like other reinforcing fillers, silicas are typically specified by BET surface area. BET surface area is determined by the Bumauer-Emmet-Teller method, which is based on nitrogen adsorption, and is described in *The Journal of the American Chemical Society,* 60 p. 309 (February, 1938). Nitrogen adsorption measures the surface areas of the individual, spherical, primary particles of silica.

Although BET surface area can be quantitative predictor of performance of some non-silica reinforcing fillers in hydrocarbon-based elastomer, it is less useful in predicting the effect of silica reinforcing fillers on properties in either hydrocarbon-based or silicone elastomers. Machurat, et al., in U.S. Pat. No. 4,251,281 teach that silica particles having considerably different BET surface areas can give similar properties in organic elastomer. More recently, Okel and Waddell reported in *Rubber Chemistry and Technology,* 68 p. 59 (March–April 1995) that, for precipitated silica fillers used in high consistency silicone elastomer, no single physical property of the silica could be used to predict silicone elastomer performance. Similarly, in silicone elastomer formulations containing fumed silicas, different silicas that have the same BET surface area measurement can give different Theological and mechanical properties in silicone sealant formulations. Therefore, new methods of specifying silica characteristics are needed to improve the consistency of silicone elastomer properties.

The Carman surface area is a measure of the structure level of particles. The term structure, in this instance, refers to the tendency for spherical particles to form clusters or aggregates. The method for measuring Carman surface area (CSA) is described by H. Carman and P. Malherbe, *J.Soc.Chem.Ind.,London* 69, 134 (1950). A known weight of silica is compressed into a pellet of known dimensions and density. Air flow through the pellet is then measured. The reported CSA is the relationship between the air flow and the compressibility of the aggregates. Depending on the aggregate structure, voids of various sizes are formed within the pellet. These voids control the air flow through the silica. High structure fumed silicas have smaller, open branched chain aggregates and high Carman surface area values. For instance, a highly structured aggregate with many fingers will closely compact, forming small voids. In turn, the air flow rate will diminish, yielding a higher CSA. Low structure fumed silicas have a large grape cluster-like aggregates and low CSA values. Depending upon manufacturing conditions such as flame temperature and feed rate, a broad range of CSA values, and therefore aggregate shapes, can be prepared for a silica having a given BET surface area.

CSA has not previously been recognized as an important parameter in characterizing silicas for use as reinforcing fillers in silicone elastomers. Recently, however, H. Cochrane and C. S. Lin, in *Rubber Chemistry and Technology* 66(1) pp. 48–60 (1993), "The Influence Of Fumed Silica Properties On The Processing, Curing, And Reinforcement Properties Of Silicone Rubber," investigated the effect of varying fumed silica properties including load, surface area, silica structure level, and surface pretreatment levels, on the silicone elastomer processing, curing, and cured physical properties. Structure level was measured with by CSA. They found that increasing the silica structure level at a constant BET surface area gave elastomer compounds with increases in plasticity, creping, crosslink density, modulus yield point, and durometer.

The use of regression techniques to analyze data is well known and applied to various fields of science and engineering. Regression procedures use the values of one or more independent variables (the x values) to predict the value of a dependent variable (the y value). The independent variables are the known, or predictor, variables. When the independent variables are varied, they result in a corresponding value for the dependent, or response, variable.

To perform a regression analysis, data on properties for several known samples is collected and a regression analysis equation is generated that describes the relationship of the properties to each other. A multidimensional regression equation may or may not be graphically represented, and the regression equation may be non-linear. In these cases, the equation that provides the best fit for the data is typically determined by several iterations, and may be assisted by use of a computer program. Once the equation that describes the relationships between properties for known samples is determined, that equation can be used to predict unknown properties in new samples. The known properties of the new samples are used in the equation, and the equation can be solved for the value of the unknown properties. For example, Dechene et al. in U.S. Pat. No. 5,367,260 teach a method by which physical properties of thermoplastics are measured by NMR techniques and related back to the flow rates of those plastics.

The use of regression analysis of physical properties of silica to predict the performance of silicone rubber has not been studied extensively. However, Okel and Waddell, supra, did analyze 25 properties of precipitated silicas on fourteen silicone rubber performance characteristics. They concluded that, for precipitated silica, a combination of (BET) surface area, oil absorption, particle size, pH, adsorbed moisture, residual sodium and/or residual salt can qualitatively predict the physical performance of high-temperature-vulcanized, high-consistency, precipitated silica-filled silicone rubber.

The use of the silica parameters defined by Okel and Waddell, supra, to control properties in fumed silica-filled silicone rubber is not particularly practical. For fumed silica, properties such as residual sodium are not relevant because fumed silicas are not produced from the acid neutralization of a metal silicate in the manner that precipitated silicas are. Furthermore, the parameters only describe the characteristics of the silica, and do not provide any ability to adjust a silicone elastomer formulation to achieve desired silicone elastomer properties for a given silica.

An object of this invention is to provide a method of controlling a Theological or physical property of a given silicone elastomer composition of known silica volume fraction by selecting the BET and CSA of a silica. A further object of this invention is to provide a method for adjusting the amount of silica in a silicone elastomer formulation to provide a desired physical or rheological property when the CSA and BET are known.

SUMMARY OF THE INVENTION

This invention relates to the use of a newly discovered relationship between two properties of fumed silica, the volume fraction of silica in an elastomer composition, and the Theological and physical properties of silicone elastomer compositions. The method of this invention uses BET and CSA measurements and volume fraction of silica in the silicone elastomer formulation to generate a regression analysis equation, or curve, which is then used to predict and control the property of interest in the silicone elastomer composition. A formulator may then control an elastomer property by selecting a BET and CSA combination of a silica that give the desired property in the silicone elastomer composition.

Use of this method unexpectedly allows the formulator to reduce the amount of silica in a curable silicone composition, while maintaining the same sealant properties by increasing the CSA or decreasing the BET surface area. Similarly, properties such as viscosity, yield stress, plasticity, durometer, and modulus are unexpectedly increased for a given formulation at a constant amount of silica while increasing the CSA or decreasing the BET surface area, rather than increasing the BET. This is surprising in light of conventional practice in reinforcing technology for silicones containing silica, where it would be understood that decreased BET would lead to lower viscosity, yield stress, plasticity, durometer, and modulus values.

DETAILED DESCRIPTION OF THE INVENTION

This invention relates to a method of controlling silica reinforcement in a curable silicone composition having a desired property related to the silica reinforcement, the method comprising adding to the curable silicone composition a volume fraction of reinforcing silica filler sufficient to provide the desired property, where the volume fraction is determined by use of a regression analysis equation relating the volume fraction, Carman surface area (CSA), and Bumauer-Emmet-Teller surface area (BET) of the reinforcing silica filler to the desired property.

The method of this invention makes use of a newly discovered relationship between BET and CSA of silica and the properties of curable silicone elastomers filled with silica. Using this method, where a particular volume fraction of silica is desired, a new silica can be selected so that a desired property is achieved by using the regression analysis equation to determine the CSA and BET that must be specified in the new silica. Alternatively, the volume fraction required to get a desired property for the new silica can be calculated when the CSA and BET of the new silica are known.

More particularly, the regression analysis equation of this method is determined by:

(A) Selecting a plurality of reinforcing silica fillers of varying CSA values and varying BET surface area values, (B) compounding a plurality of samples of the curable silicone composition from each silica, the samples varying in the volume fraction of reinforcing silica filler used, (C) measuring the desired property for each of the samples, (D) calculating a regression analysis equation for the desired property as a function of CSA, BET, and volume fraction of the reinforcing silica filler, and (E) using the regression analysis equation to determine the CSA, BET, and volume fraction required for the reinforcing silica filler to produce the desired property.

The regression analysis equation of this method may take the form of a linear equation having a slope and an intercept, expressed by the form $y = mx + b$, where y = the desired property, x = a scaling factor defined as $(BET)^p (CSA^* \phi)^q$, where
BET = the B.E.T. surface area of the filler,
CSA = the Carman surface area of the filler,
p and q are unique parameters determined by nonlinear regression analysis for each curable silicone formulation, and
$\phi$ = the volume fraction of the filler, defined by $(m_{filler}/\rho_{filler}) \div ((m_{filler}/\rho_{filler}) + (m_{polymer}/\rho_{polymer}))$, where
$m_{filler}$ is the mass of the filler in the formulation,
$\rho_{filler}$ is the density of solid silicon dioxide (2.2 g/cc)
$m_{polymer}$ is the mass of the polymer in the formulation and
$\rho_{polymer}$ is the density of the polymer used
m = the slope of the regression analysis equation,
b = the intercept of the regression analysis equation.

The parameters p and q, and therefore the scaling factor, x, are unique for each formulation and cure chemistry of silicone elastomer. The parameters p and q are determined by making of series of elastomer samples using varying amounts of silicas with varying CSA and BET, while holding the type and ratios of non-silica components, curable polydiorganosiloxane, crosslinking agent, catalyst, and any other additives constant. Rheological, curing and physical properties are measured for each sample. Nonlinear regression analysis is then used on the data to determine the p and q required to give the analysis equation, or curve with the best fit to the data. This scaling factor x can be used in other data analysis, or curve-fitting procedures, both linear and nonlinear, to fit the function to additional data, or to refine the values of p and q.

Any suitable nonlinear regression technique that determines parameters p and q such to give good fit to the data is acceptable. Another technique is to determine q for the silicas with equivalent BET measurement by plotting the log of the value of the desired property against the log of the volume fraction of silica. The slope of this plot is q. Then, p is determined for silicas with equivalent CSA and loading level by comparing the log of the value of the property against the log of the BET of the silica used.

An example of a computer program that can be used in finding a regression equation that best fits data is SigmaPlot, manufactured by Jandel Corporation. SigmaPlot is a curve fitter that uses the Marquardt-Levenberg algorithm to find the coefficient, or parameters, of the independent variable or variables that give the best fit between the equation and the data. This algorithm seeks the values of the parameters that minimize the sum of the squared differences between the values of the observed and predicted values of the dependent variable. This method is also referred to as minimizing the Chi-squared function, and is a technique well known in the art of nonlinear regression analysis. This method also gives a multiple correlation coefficient, $R^2$. This is a number between −1 and +1 that indicates the degree of relationship of the response variable to the combined linear predictor variables. When $R^2=1$ there is perfect correlation between the predictor variables and the response variable. When $R^2=-1$ there is a perfect inverse correlation. When $R^2=0$ there is no correlation between the predictor and response variables.

The amount of reinforcement that is controlled using this method can be measured by any properties affected by silica reinforcement. Physical or mechanical properties are measured on cured elastomer, and include tensile, elongation, modulus, and durometer. The rheological pronature of the siloxane polpend to some extent on the nature of the siloxane polymer. For high consistency materials, where the polymer is gum-like, the properties measured may include plasticity. For low consistency polymers, or viscous liquids, the rheological properties would include viscosity, extrusion rate, and plateau stress. Plateau stress is an indicator of uncured silicone sealant stability is described in by Deleeuw, et. al in U.S. Pat No. 5,652,376 and Lower in U.S. Pat. No. 5,670,560, which are hereby incorporated for reference on plateau stress as a test method and its use with silicone sealants.

The silica used in the method of this invention is fumed silica, which is also well known in the art. In the method of this invention, the key properties to be measured in characterizing the silica are the BET surface area and CSA. The BET for silicas in this method range from about 50 $m^2/g$ to 1000 $m^2/g$, and preferably range from 100 to 400 $m^2/g$, and more preferably from about 170 to 320 $m^2/g$. The CSA for silicas in this method range from about 10 to 500 $m^2/g$, and preferably range of from about 50 to about 225 $m^2/g$, and more preferably in a range from about 90 to 145 $m^2/g$.

It is preferable that the silicas that are being compared have a similar type and level of surface treatment. Treatment of silicas is known in the art, and affects the interaction between silica and silicone polymers. For example, silicas may be surface-treated with an organosilicon compound selected from the group consisting of organosilanes, organosilazanes, organosiloxane oligomers, and mixtures of these compounds. It would be expected that treatment of the filler would affect reinforcement, as measured by the rheological and physical properties of silicone elastomer composition, requiring another factor in a regression analysis. Therefore, in the present invention, it is preferable to have the chemical treating agent be done with the same organosilicon compound. Where the silica is treated in situ, the ratio of the amount of treating agent to the amount of filler in the curable silicone elastomer composition should also be kept the same.

The curable silicone elastomers of the present invention are well known in the art, and comprise mixtures of curable polyorganosiloxane, silica, and a means of curing the polyorganosiloxane into an elastomer. Curable silicone elastomers may have consistency ranging from a viscous liquid to a gum-like consistency. Once the curing means is activated by a suitable means such as heat, moisture, or radiation, the curable silicone elastomer becomes a cured elastomer.

Curable polyorganosiloxanes are also well known in the art, and comprise polysiloxanes having primarily diorganosiloxane units but which may also contain small amounts of triorganosiloxane, mono-organosiloxane, and $SiO_2$ units. The preferred curable polyorganosiloxanes are those which are substantially linear in nature and have a ratio of organic substituents to silicon atoms within the range of about 1.98:1 to 2.01:1.

The organic groups on the curable polyorganosiloxane can be monovalent hydrocarbon radicals or monovalent halogenated hydrocarbon radicals. Examples of such radicals are alkyl radicals, e.g. methyl, ethyl, propyl, octyl, and octadecyl; alkenyl radicals e.g. vinyl, and allyl; aryl, aralkyl, and alkaryl radicals e.g. phenyl, phenylethyl, benzyl, and tolyl; and fluroalkyl radicals e.g. 3,3,3-trifluoropropyl. Preferably, at least 50 percent of the total radicals substituted on the silicon atom are methyl radicals with any remaining radicals being selected from phenyl, vinyl, and 3,3,3-trifluoropropyl. When alkenyl radicals are present in the curable polyorganosiloxane such radicals preferably comprise less than about 0.5% of the total organic groups. Small proportions of functional radicals such as hydroxyl, acyloxy, and oximo may also be present, especially in terminal siloxane units. Such functional radicals will normally be present when the curable elastomer composition is of the so-called room temperature vulcanizing type, or sealant.

The curable polyorganosiloxanes may be homopolymers or copolymers and may vary in consistency from viscous liquids to stiff, high molecular weight gums. Examples of curable polyorganosiloxanes which may be employed in the process of this invention therefore include polydimethylsiloxane, poly(3,3,3-trifluoropropyl)methyl siloxanes, copolymers of dimethylsiloxane units and vinylmethylsiloxane units and diphenylsiloxane units. As stated above, the copolymers may be terminated with functional radicals e.g. hydroxyl. They may, however, be terminated with any desired siloxane unit, for example trimethylsiloxane units, vinyldimethylsiloxane units and vinylmethylphenylsiloxane units. Except to the extent it may form part of the curing mechanism the particular type of terminal unit is not critical.

The curing means can be any of the well-known curing means known in the silicone elastomer art. The method of the present invention will work with any curing means selected. However, the relationship between BET, CSA and volume fraction of silica in the composition are specific to a particular curable silicone elastomer composition, including the curing means for that curable silicone elastomer composition.

For example, the curable silicone elastomer compositions of this invention may be converted to the elastomeric state by exposure to high energy radiation or by the use of a heat activated curing agent. Examples of the latter include benzoyl peroxide, dicumyl peroxide, tertiary butyl peracetate, tertiary butyl perbenzoate, monochlorobenzoyl peroxide, 2,4-dichlorobenzoyl peroxide, and tertiary butyl cumyl peroxide.

Yet another curing method is where the curable silicone elastomer composition is cured by crosslinking the polyorganosiloxane with an organohydrogensiloxane crosslinker in the presence of a platinum group metal-containing catalyst. The polyorganosiloxane has at least two silicon-bonded alkenyl groups, preferably vinyl groups per polymer molecule. The organohydrogensiloxane crosslinker contains an average of at least two silicon-bonded hydrogen atoms per molecule, and no more than one silicon-bonded hydrogen atom per silicon atom, the remaining valences of the silicon atoms being satisfied by divalent oxygen atoms or by monovalent hydrocarbon radicals comprising one to seven carbon atoms. The monovalent hydrocarbon radicals can be, for examples, alkyls such as methyl, ethyl, propyl, tertiary butyl, and hexyl; cycloalkyls such as cyclohexyl; aryls such as phenyl and tolyl; and halogen substituted alkyls such as 3,3,3-trifluorpropyl and perfluoropropyl. The platinum group metal-containing catalyst can be any such catalyst which is known to catalyze the reaction of silicon-bonded hydrogen atoms with silicon-bonded vinyl groups. By platinum group metal, it is meant ruthenium, rhodium, palladium, osmium, iridium, and platinum.

Also applicable is the room-temperature vulcanizing mechanism, frequently used for silicone sealants, wherein the polyorganosiloxane contains functional radicals, e.g. hydroxyl, oximo, or acyloxy and curing takes place at normal or slightly elevated temperatures with or without the addition of a crosslinking agent and a curing catalyst. When a crosslinker is used, it is typically an organosilicon compound having at least two or, preferably, three hydrolyzable groups bonded to the silicon atom or atoms in the molecule. When the organosilicon is added to the polydiorganosiloxane, a condensation reaction takes place between the hydrolyzable group of the organosilicon compound and the terminal hydroxy group of the polydiorganosiloxane to form a crosslink. Examples of the organosilicon compounds include compounds such as triacetoxy silane, alkoxy silane compounds, e.g. methyl trimethoxy silane, vinyl trimethoxy silane, methyl triethoxy silane, vinyl triethoxy silane, ethyl orthosilicate, and propyl orthosilicate; alkenyloxy silane compounds, e.g. methyl tripropenyloxy silane and vinyl tri(isopropenyloxy)silane; oxime silane compounds, e.g. methyl tri(acetonoxime) silane and methyl tris(butanonoxime) silane; amino-containing silane compounds, e.g. methyl tris(dimethylamino) silane and methyl tris (diethylamino) silane; amido-containing silane compounds, e.g. methyl tris (N-methyl acetamido) silane and vinyl tris (N-ethyl acetamido) silane; aminoxy-containing silane compounds, e.g. methyl tris (dimethylaminoxy) silane and methyl tris(diethlyaminoxy) silane.

EXAMPLES

Examples are given below for several sealant and high consistency elastomer systems. The regression equation used for these examples was y=mx+b, wherein
  y=the desired property,
  x=a scaling factor defined as $(BET)^p(CSA*\phi)^q$, where
    BET=the B.E.T. surface area of the filler,
    CSA=the Carman surface area of the filler,
    p and q are unique parameters determined by non-linear regression analysis for each curable silicone formulation, and
  $\phi$=the volume fraction of the filler, defined by $(m_{filler}/\rho_{filler})$
    $\div((m_{filler}/\rho_{filler})+(m_{polymer}/\rho_{polymer}))$, where
    $m_{filler}$ is the mass of the filler in the formulation,
    $\rho_{filler}$ is the density of solid silicon dioxide (2.2 g/cc)
    $m_{polymer}$ is the mass of the polymer in the formulation and
    $\rho_{polymer}$ is the density of the polymer used
  m=the slope of the regression analysis equation,
  b=the intercept of the regression analysis equation.

The parameters p and q were determined for each formulation by making samples of varying silica BET, CSA, and volume fractions and measuring values of selected properties for each sample. In formulating the samples, the low molecular weight siloxane crosslinker was adjusted with the filler content to keep the ratio of filler to crosslinker constant. Similarly, the ratio of catalyst to crosslinker was also kept constant. This is in keeping with the approach of Cochrane and Lin, supra, p. 49.

The BET surface area for each filler was used as specified from the manufacturer. CSA values were determined using the Carman surface area tests, the principles of which are described in detail by Carman and Malherbe, supra, which is hereby incorporated for reference for such methods. The porosity selected for each silica was between 0.6 and 0.75, selected for each sample based on reproducibility.

Rheological properties measured for the uncured silicone compositions included plasticity, viscosity, and plateau stress values.

Plasticity, a measure of resistance to flow, was measured on uncured, high consistency elastomer materials by using ASTM D926.

Extrusion rate was measured on flowable, relatively low viscosity materials, such as sealants, by measuring the rate at which the material extruded- through a standard nozzle under a specified pressure. The results are reported in grams per minute. Extrusion rates were measured using MIL specification MIL-S-8802D, with a pressure of 90 PSI (620.5 kPa) and a ⅛ inch (3.175 mm) orifice.

Plateau stress values were determined on a Carri-Med Rheometer (Model CSL 500) using a cone and plate. The flow method was used to determine stress values. The cone was a 0.5 degree, 2 cm diameter cone and the gap between the cone and the plate was 13 microns (the test specimen thickness). The sealant mixture was gently removed from the storage container. A few grams were placed on the temperature controlled bottom plate (at 25° C.) before the plate was raised into position with the top cone to provide a specimen thickness of 13 microns. The test specimen was allowed to equilibrate for 1 to 5 minutes to reach 25° C. A stress of 2500 Pa was applied for 30 s. Then the stress was ramped down to 10 Pa in 5 min. The plateau stress was taken as the value of stress at which the flow is last detectable.

Viscosity was measured during the above method for plateau stress at the point at which a stress of 2500 Pa was applied for 30 s.

Sealant samples were tested by creating slabs of 2.54 mm thickness and curing for 7 days at room temperature and 50% relative humidity. Heat-cured samples were tested by creating slabs, curing, followed by heat-treatment for 4 hours at 177° C.

Tensile and elongation were tested on 0.157" (3.94mm) wide tensile bars with a 45 mm gauge length. The tensile bars were tested using ASTM D412, and were pulled at a rate of 500 mm/min, with the average test value of 3 to 5 bars reported. Shore A durometer was measured using ASTM D 2240.

Example 1

Parameters p and q were determined for a flowable, room temperature curable composition containing a methyltrimethoxy silane crosslinker and titanium catalyst. The samples were formulated with 3 to 12 weight % silica filler, 2.7 to 10 weight % methyltrimethoxy silane, 0.25 to 0.8 wt % titanium butoxide, and 75 to 95 percent dimethylvinylsiloxy-terminated ended siloxane polymer. The CSA of several fumed silicas of varying BET surface area was measured. A set of 3 silicas was selected such that CSA could be varied while BET surface area was held constant. Two additional silicas were chosen to allow the BET surface area to be varied while CSA was held constant. Measurements of CSA and BET were considered equivalent if they were within 4 points, because of the error limits of the testing procedures used. The BET and CSA values of the silicas and the composition of the test samples are listed in Table 1.

TABLE 1

Formulations of room temperature curable composition with methyltrimethoxy silane crosslinker.

| Sample No. | filler BET, $m^2/g$ | filler CSA, $m^2/g$ | filler level, weight % | methyltri-methoxy silane, weight % | vinyldimethyl-siloxy terminated polydimethyl-siloxane, 40 Pa · s, weight % | titanium butoxide, weight % | Plateau stress, Pa |
|---|---|---|---|---|---|---|---|
| 1-1  | 249 | 102 | 6 | 5.67 | 88 | 0.524 | 44.77 |
| 1-2  | 249 | 102 | 7 | 6.39 | 86 | 0.61  | 91.82 |
| 1-3  | 249 | 102 | 8 | 7.3  | 84 | 0.7   | 121.6 |
| 1-4  | 249 | 102 | 9 | 8.19 | 82 | 0.786 | 194.3 |
| 1-5  | 251 | 114 | 6 | 5.67 | 88 | 0.524 | 67.1 |
| 1-6  | 251 | 114 | 7 | 6.39 | 86 | 0.61  | 129.5 |
| 1-7  | 251 | 114 | 9 | 7.3  | 82 | 0.786 | 257.3 |
| 1-8  | 251 | 114 | 9 | 8.19 | 82 | 0.786 | 257.3 |
| 1-9  | 249 | 117 | 6 | 5.67 | 88 | 0.524 | 69.32 |
| 1-10 | 249 | 117 | 9 | 8.19 | 82 | 0.786 | 257.3 |
| 1-11 | 253 | 129 | 6 | 5.67 | 88 | 0.524 | 86.26 |
| 1-12 | 253 | 129 | 7 | 6.39 | 86 | 0.61  | 161.1 |
| 1-13 | 253 | 129 | 8 | 7.3  | 84 | 0.7   | 234.3 |
| 1-14 | 253 | 129 | 9 | 8.19 | 82 | 0.786 | 351.7 |
| 1-15 | 198 | 105 | 6 | 5.67 | 88 | 0.524 | 54.0 |
| 1-16 | 198 | 105 | 9 | 8.19 | 82 | 0.786 | 273.9 |
| 1-17 | 304 | 131 | 6 | 5.67 | 88 | 0.524 | 73.79 |
| 1-18 | 304 | 131 | 8 | 7.3  | 84 | 0.7   | 188.3 |

Several sealant formulations were prepared, with fillers having equivalent BET values, using the formulations in Table 1. In the sealant formulations, the amount of filler, crosslinker, and catalyst were adjusted so that the ratio of filler to crosslinker was about 1.096 and the ratio of catalyst to crosslinker was 0.096. The property measured was plateau stress, $\tau_P$. The volume percent was calculated from the weight of the filler. The density of solid silica was approximated at 2.2 g/cc, and the density of polymer components was approximated at 1 g/cc. The log of plateau stress, $\tau_P$ (where P stands for plateau), was plotted against the log of the volume percent for each of the fillers. A slope, equal to q, was determined for each of the fillers, and is listed in Table 2. An average q of 2.52 was determined and used in the remaining calculations. This means that $\tau_P$ is proportional to $\phi^{2.52}$.

TABLE 2

Slope of log(plateau stress) vs. log(volume % of filler)

| BET | CSA | Slope = q |
|---|---|---|
| 249 | 102 | 2.58 |
| 251 | 114 | 2.44 |
| 253 | 129 | 2.53 |
| 249 | 117 | 2.55 |

The ratio of the values of rp for samples containing the same amount of filler is approximately the ratio of the CSA values to the q value from above, leading to the relationship that $\tau_P$ is also proportional to $(\phi*CSA)^{2.52}$. See Table 3.

TABLE 3

Comparison of ratios of CSA raised to the q power, and ratios of plateau stress

| $CSA_1$ | $CSA_2$ | $\tau_{P1}$ | $\tau_{P2}$ | $(CSA_1/CSA_2)^{2.52}$ | $\tau_{P1}/\tau_{P2}$ |
|---|---|---|---|---|---|
| 129 | 102 | 3517 | 1943 | 1.80 | 1.81 |
| 129 | 114 | 3517 | 2573 | 1.36 | 1.36 |
| 129 | 117 | 3517 | 2573 | 1.28 | 1.36 |
| 114 | 102 | 2573 | 1943 | 1.32 | 1.32 |
| 114 | 117 | 2573 | 2573 | 0.94 | 1.0 |

To determine the impact of BET surface area, compare the ratio of $\tau_P$ for each of the samples with approximately the same CSA and loading level. Using the relationship of log $(\tau_{P1}/\tau_{P2}) = p*\log(BET1/BET2)$, the coefficient p can be calculated for each set of samples. Here, the average value of p is −1.1.

TABLE 4

Effect of BET on $\tau_P$

| $\tau_{P1}$ | $\tau_{P2}$ | BET1 | BET2 | p |
|---|---|---|---|---|
| 2739 | 1942 | 198 | 245 | −1.5 |
| 1883 | 2343 | 304 | 253 | −1.2 |
| 540  | 448  | 198 | 249 | −0.85 |
| 738  | 863  | 304 | 253 | −0.82 |

In order to generate the ability to predict using this relationship, $\tau_P$ is determined as a function of $(BET)^{-1.1}$ $(CSA*\phi)^{2.52}$, using standard regression techniques. If a linear regression is used, this gives a standard linear fit of y=mx+b, where y is the desired property, x is $(BET)^{-1.1}$ $(CSA*)^{2.52}$, m is the slope of the line, and b is the intercept.

In this case the slope m was found to be 2233, and the intercept b was found to be −32.5, giving an equation of plateau stress=$2233((BET)^{-1.1}(CSA*\phi)^{2.52})-32.5$.

The value of the correlation coefficient, $R^2$ for this equation was found to be 0.986.

Example 2

The parameters p and q were determined for a flowable, room temperature curable elastomer composition containing an acetoxy silane crosslinker and an organotin catalyst. The samples were formulated with 6.6.to 10.5 weight % silica filler, 82.2 to 88 weight % of a hydroxy-terminated, linear dimethylsiloxane polymer, 4.58 to 7.3 weight % of an acetoxysilane crosslinker (mixture of trimethoxysilane and triethoxysilane), and 0.1 to 0.3 weight % dibutyltindiacetate (DBTDA) catalyst. A set of six silicas of varying CSA and BET were used. Several sealant samples were prepared, and their formulations are listed in Table 5. The amount of filler, crosslinker and catalyst added to the composition were adjusted so that the ratio of filler to crosslinker was 0.69 and the ratio of catalyst to crosslinker was 0.0042.

TABLE 6

Property measurements for room temperature curable compositions with acetoxy silane crosslinker

| Sample ID | Viscosity, Pa · s | Plateau Stress, Pa | Tensile Strength, MPa | elongation, % | 100% Modulus |
|---|---|---|---|---|---|
| 2-1 | 51.8 | 358.5 | — | — | — |
| 2-2 | 762.8 | 1381.0 | — | — | — |
| 2-3 | 40.7 | 245.7 | 0.91 | 566 | 0.27 |
| 2-4 | 382.7 | 1285.0 | 2.64 | 800 | 0.47 |
| 2-5 | 58.3 | 469.5 | 1.27 | 596 | 0.33 |
| 2-6 | 1774.0 | 1683.0 | 2.27 | 608 | 0.58 |
| 2-7 | 49.6 | 378.4 | 1.36 | 669 | 0.31 |
| 2-8 | 1124.0 | 1406.0 | 2.18 | 600 | 0.55 |
| 2-9 | 56.4 | 378.4 | 1.19 | 606 | 0.32 |
| 2-10 | 113.3 | 648.9 | 1.65 | 643 | 0.38 |
| 2-11 | 982.7 | 1196.0 | 2.20 | 694 | 0.49 |
| 2-12 | 39.6 | 216.7 | 1.04 | 586 | 0.27 |
| 2-13 | 81.2 | 603.9 | 1.87 | 787 | 0.35 |
| 2-14 | 458.3 | 1309.0 | 2.48 | 799 | 0.46 |
| 2-15 | 40.3 | 333.6 | 1.15 | 565 | 0.32 |
| 2-16 | 117.1 | 805.2 | 1.64 | 607 | 0.42 |
| 2-17 | 572.6 | 1356.0 | 2.25 | 645 | 0.54 |
| 2-18 | 104.0 | 790.9 | 1.61 | 610 | 0.40 |

TABLE 5

Formulations of room temperature curable composition with acetoxy silane crosslinker

| Sample ID | Silica BET, m²/g | Silica CSA, m²/g | Silica loading, wt % | Silica, vol. fraction | hydroxy endblocked dimethylsiloxane polymer, wt % | acetoxy silane crosslinker, wt % | DBTDA, wt % |
|---|---|---|---|---|---|---|---|
| 2-1 | 251 | 114 | 6.6 | 0.031 | 88.80 | 4.58 | 0.020 |
| 2-2 | 251 | 114 | 10.5 | 0.051 | 82.20 | 7.30 | 0.030 |
| 2-3 | 249 | 102 | 6.6 | 0.031 | 88.80 | 4.58 | 0.020 |
| 2-4 | 249 | 102 | 10.5 | 0.051 | 82.20 | 7.30 | 0.030 |
| 2-5 | 253 | 129 | 6.6 | 0.031 | 88.80 | 4.58 | 0.020 |
| 2-6 | 253 | 129 | 10.5 | 0.051 | 82.20 | 7.30 | 0.030 |
| 2-7 | 304 | 131 | 6.6 | 0.031 | 88.80 | 4.58 | 0.020 |
| 2-8 | 304 | 131 | 10.5 | 0.051 | 82.20 | 7.30 | 0.030 |
| 2-9 | 251 | 114 | 6.6 | 0.031 | 88.80 | 4.58 | 0.020 |
| 2-10 | 251 | 114 | 8.5 | 0.041 | 85.60 | 5.90 | 0.025 |
| 2-11 | 251 | 114 | 10.5 | 0.051 | 82.20 | 7.30 | 0.030 |
| 2-12 | 249 | 102 | 6.6 | 0.031 | 88.80 | 4.58 | 0.020 |
| 2-13 | 249 | 102 | 8.5 | 0.041 | 85.60 | 5.90 | 0.025 |
| 2-14 | 249 | 102 | 10.5 | 0.051 | 82.20 | 7.30 | 0.030 |
| 2-15 | 174 | 91 | 6.6 | 0.031 | 88.80 | 4.58 | 0.020 |
| 2-16 | 174 | 91 | 8.5 | 0.041 | 85.60 | 5.90 | 0.025 |
| 2-17 | 174 | 91 | 10.5 | 0.051 | 82.20 | 7.30 | 0.030 |
| 2-18 | 198 | 105 | 8.5 | 0.041 | 85.60 | 5.90 | 0.025 |

The properties measured were viscosity, plateau stress, tensile, elongation, and modulus. The results are given in Table 6.

The parameters p and q, as well as the slope and intercept for each property as a function of $(BET)^p(CSA*\phi)^q$ were determined using SigmaPlot regression software. The results are given in Table 7.

TABLE 7

Best fit parameters for selected properties as a function of BET, CSA, and volume fraction for room temperature curable compositions with acetoxy silane crosslinker

| Property(y) | p | q | x | slope, m | intercept, b | $R^2$ |
|---|---|---|---|---|---|---|
| Viscosity, Pa·s | −3.00 | 6.54 | $(BET)^{-3.00(CSA*\phi)6.54}$ | 138000 | −3.10 | 0.99 |
| Plateau stress, Pa | −0.76 | 1.29 | $(BET)^{-0.76(CSA*\phi)1.29}$ | 14100 | −787 | 0.95 |
| Tensile, MPa | −0.081 | 0.17 | $(BET)^{-0.08(CSA*\phi)0.17}$ | 15.2 | −10.7 | 0.80 |
| Elongation, % | 0.65 | 0.18 | $(BET)^{0.65(CSA*\phi)0.18}$ | 318 | 55.5 | 0.15 |
| 100% Modulus, MPa | −1.02 | 1.52 | $(BET)^{-1.02(CSA*\phi)1.52}$ | 7.8 | 0.11 | 0.98 |

Examples 1 and 2 illustrate the correlations between the measured properties and the silica when BET, CSA and volume fraction parameters are used. If only BET and volume fraction are used, the correlation coefficient, $R^2$, generated for the viscosity data is only 0.66. By including the CSA parameter the correlation increases significantly to 0.986. Similar improvements are seen for the other properties tested. The higher $R^2$ values mean that a given property can be predicted or targeted with greater precision when the CSA is used. Furthermore, the results above indicate surprisingly that the physical properties of the elastomers are more sensitive to changes in CSA than BET which is the silica structure property typically used to predict silica reinforcement of curable silicone rubber compositions. Furthermore, increasing the BET at a equivalent CSA and filler loading actually leads to a decrease in the mechanical properties of the system (compare samples 2–6 to 2–8, and 2–5 to 2–7, and 2–13 to 2–18). By utilizing BET, silica loading, and CSA measurements to correlate properties, significant enhancements in prediction and control of the silicone materials' rheological and physical properties are obtained. This is of particular value to understand the impact of lot to lot variations in silica structure and also for minimizing the amount of filler necessary for a given property profile for a given formulated product.

Although some correlation is found with ultimate failure properties, tensile strength and % elongation, these tend to be less well correlated than properties such as modulus, durometer, plasticity, viscosity, and plateau stress because the ultimate properties can be significantly impacted by any flaws or imperfections in the material. These flaws act as sites to initiate the failure of the material and thus impact the measured elongation and tensile strength. In example 2, the filler structure plays little role in determining the % elongation as is indicated by the low $R^2$ value.

Example 3

Parameters p and q were determined for a high consistency, peroxide curable silicone elastomer composition. Samples were formulated with 48.1 to 54.9 parts by weight vinyldimethylsiloxy-terminated dimethyl, vinylmethyl siloxane copolymer, 12.5 to 18.1 parts by weight silica, and 2.6 to 3.8 parts by weight of hydroxy-terminated dimethylsiloxane. The ratio of hydroxy-terminated dimethylsiloxane to filler was maintained at 0.21. The formulations for these samples are given in Table 8.

TABLE 8

Formulations for a high consistency, peroxide curable silicone composition

| Sample | BET, m²/g | CSA, m²/g | Filler, g | PA, g | Dimethyl-vinylsiloxy-terminated Dimethyl, Methylvinyl Siloxane, g | Vol. fraction silica |
|---|---|---|---|---|---|---|
| 3-1 | 170 | 90 | 12.5 | 2.6 | 54.9 | 0.09 |
| 3-2 | 170 | 90 | 15.1 | 3.2 | 51.7 | 0.11 |
| 3-3 | 170 | 90 | 18.1 | 3.8 | 48.1 | 0.14 |
| 3-4 | 170 | 90 | 18.1 | 2.6 | 48.1 | 0.14 |
| 3-5 | 195 | 100 | 12.5 | 2.6 | 54.9 | 0.09 |
| 3-6 | 195 | 100 | 15.1 | 3.2 | 51.7 | 0.11 |
| 3-7 | 195 | 100 | 18.1 | 3.8 | 48.1 | 0.14 |
| 3-8 | 195 | 100 | 18.1 | 3.8 | 48.1 | 0.14 |
| 3-9 | 249 | 102 | 12.5 | 2.6 | 54.9 | 0.09 |
| 3-10 | 249 | 102 | 15.1 | 3.2 | 51.7 | 0.11 |
| 3-11 | 249 | 102 | 18.1 | 3.8 | 48.1 | 0.14 |
| 3-12 | 249 | 117 | 15.1 | 3.2 | 51.7 | 0.11 |
| 3-13 | 249 | 117 | 18.1 | 3.8 | 48.1 | 0.14 |

TABLE 8-continued

Formulations for a high consistency, peroxide curable silicone composition

| Sample | BET, m²/g | CSA, m²/g | Filler, g | PA, g | Dimethyl-vinylsiloxy-terminated Dimethyl, Methylvinyl Siloxane, g | Vol. fraction silica |
|---|---|---|---|---|---|---|
| 3-14 | 251 | 114 | 12.5 | 2.6 | 54.9 | 0.09 |
| 3-15 | 253 | 129 | 15.1 | 3.2 | 51.7 | 0.11 |
| 3-16 | 253 | 129 | 18.1 | 3.8 | 48.1 | 0.14 |
| 3-17 | 304 | 131 | 12.5 | 2.6 | 54.9 | 0.09 |
| 3-18 | 304 | 131 | 18.1 | 3.8 | 48.1 | 0.14 |
| 3-19 | 315 | 145 | 12.5 | 2.6 | 54.9 | 0.09 |
| 3-20 | 315 | 145 | 18.1 | 3.8 | 48.1 | 0.14 |

These samples were compounded on a Rheocord 90 batch mixer with sigma blades at 35 RPM for 30 minutes, heated at 160° C. for 90 minutes while mixing continued, and then cooled without mixing for 30 minutes. The samples were cured by adding 1.25 parts 2, 5 dimethyl-2,5 di(t-butylperoxy) hexane (Varox, manufactured by R. T. Vanderbilt Company, Norwalk Conn.) to each sample and curing at 175° C. for 10 minutes.

Properties were measured for each of the samples, and are recorded in Table 9.

TABLE 9

Selected properties measured for high consistency, peroxide curable silicone compositions

| Sample | Plasticity, ml | durometer, Shore A | tensile, MPa | 100% mod, MPa | Tear B, kN/m |
|---|---|---|---|---|---|
| 3-1 | 58 | 36 | 3.05 | 0.43 | 4.23 |
| 3-2 | 68 | 39 | 5.19 | 0.51 | 6.60 |
| 3-3 | 93 | 45 | 7.64 | 0.67 | 10.42 |
| 3-4 | 91.5 | 45 | 6.77 | 0.70 | 9.19 |
| 3-5 | 60 | 35 | 3.76 | 0.46 | 4.63 |
| 3-6 | 77.5 | 39 | 6.02 | 0.53 | 6.63 |
| 3-7 | 84 | 43 | 6.61 | 0.60 | 9.65 |
| 3-8 | 85 | 47 | 5.67 | 0.62 | 9.25 |
| 3-9 | 52 | 40 | 3.76 | 0.47 | 4.65 |
| 3-10 | 69 | 42 | 4.91 | 0.58 | 6.16 |
| 3-11 | 88 | 47 | 6.52 | 0.71 | 9.54 |
| 3-12 | 100 | 44 | 6.97 | 0.60 | 6.98 |
| 3-13 | 121 | 49 | 8.26 | 0.79 | 10.74 |
| 3-14 | 57 | 39 | 3.38 | 0.49 | 4.79 |
| 3-15 | 107 | 45 | 6.60 | 0.67 | 7.84 |
| 3-16 | 128 | 49 | 8.55 | 0.83 | 10.70 |
| 3-17 | 72 | 39 | 4.21 | 0.53 | 5.96 |
| 3-18 | 91 | 49 | 6.20 | 0.70 | 8.81 |
| 3-19 | 74 | 38 | 3.01 | 0.48 | 4.82 |
| 3-20 | 129 | 51 | 7.17 | 0.80 | 11.16 |

Parameters p and q and a regression equation in the form $y=mx+b$ were determined for each property using SigmaPlot regression software. The results are given in Table 10.

TABLE 10

Best fit parameters for selected properties as a function of BET, CSA, and volume fraction for high consistency, peroxide curable silicone composition

| Property(y) | p | q | x | slope | intercept | $r^2$ |
|---|---|---|---|---|---|---|
| Plasticity | -0.24 | 1.11 | $(BET)^{-0.24}(CSA*\phi)^{1.11}$ | 3.34 | -9.44 | 0.90 |
| Durometer | -0.24 | 0.83 | $(BET)^{-0.24}(CSA*\phi)^{0.83}$ | 1.75 | 17.91 | 0.86 |
| 100% Modulus | -0.30 | 0.86 | $(BET)^{-0.30}(CSA*\phi)^{0.86}$ | 5.17 | -3.63 | 0.86 |
| Tensile | -0.24 | 0.39 | $(BET)^{-0.24}(CSA*\phi)^{0.39}$ | 608.3 | -2007 | 0.79 |

These equations demonstrate that about 10 points of increase in CSA at constant loading will result in about a 10% increase in the above desired properties. However, a point decrease in BET results in approximately a one percent increase in properties. These data illustrate that CSA is more important than BET in determining the properties of the system, and that raising the BET surprisingly lowers the reinforcing ability of the filler.

I claim:

1. A method of controlling silica reinforcement in a curable silicone composition having a desired property related to silica reinforcement, the method comprising adding to a curable silicone composition a volume fraction of reinforcing silica filler sufficient to provide a desired property, where the volume fraction is determined by use of a regression analysis equation relating the volume fraction, Carman surface area (CSA), and Burnauer-Emmet-Teller surface area (BET) of the reinforcing silica filler to the desired property.

2. The method of claim 1, wherein the volume fraction of a new silica is selected to provide the desired property by selection of a new silica with a BET and CSA that fit on the regression analysis equation.

3. The method of claim 1, wherein the regression analysis equation is determined by
  (A) Selecting a plurality of reinforcing silica fillers of varying CSA values and varying BET surface area values,
  (B) compounding a plurality of samples of the curable silicone composition from each silica, the samples varying in the volume fraction of reinforcing silica filler used, (C) measuring the desired property for each of the samples, (D) calculating a regression analysis equation for the desired property as a function of CSA, BET, and volume fraction of the reinforcing silica filler, and (E) using the regression analysis equation to determine the CSA, BET, and volume fraction required for the reinforcing silica filler to produce the desired property.

4. The method of claim 3, wherein the plurality of reinforcing silica fillers includes 2 or mores silicas with equivalent BET measurements, and 2 or more silicas with equivalent CSA measurements.

5. The method of claim 1, wherein the reinforcing silica filler has a BET value in the range of about 100 to 400 $m^2/g$ and a CSA value in the range of 50 to 225 $m^2/g$.

6. The method of claim 1, wherein the reinforcing silica filler has a BET value in the range of about 170 to 320 $m^2/g$.

7. The method of claim 1, wherein the reinforcing silica filler has a CSA value in the range of about 90 to 145 $m^2/g$.

8. The method of claim 1, wherein the desired property is a rheological property of the curable silicone composition.

9. The method of claim 8, wherein the rheological property is selected from the group consisting of viscosity, plateau stress, and plasticity.

10. The method of claim 1, wherein the desired property is a physical property measured after the curable silicone composition has been cured.

11. The method of claim 10, wherein the physical property is selected from the group consisting of durometer, modulus, tensile, and elongation.

12. The method of claim 1, wherein the regression analysis equation comprises a linear equation having a slope and an intercept, having a form of y=mx+b, wherein y=the desired property, x=a scaling factor defined as $(BET)^p(CSA*\phi)^q$, where BET=the B.E.T. surface area of the filler, CSA=the Carman surface area of the filler, p and q are unique parameters determined by non-linear regression analysis for each curable silicone formulation, and $\phi$=the volume fraction of the filler, defined by $(m_{filler}/\rho_{filler}) \div ((m_{filler}/\rho_{filler})+(m_{polymer}/\rho_{polymer}))$, where $m_{filler}$ is the mass of the filler in the formulation, $\rho_{filler}$ is the density of solid silicon dioxide $m_{polymer}$ is the mass of the polymer in the formulation and $\rho_{polymer}$ is the density of the polymer used m=the slope of the regression analysis equation, b=the intercept of the regression analysis equation.

13. The method of claim 12 where the parameters p and q are determined by (a) determining average q for the silicas with equivalent BET values by plotting the log of the value of the property against the log of the volume fraction of silica, and determining a slope q for this plot, and (b) determining average p for silicas with equivalent CSA and loading level by comparing the log of the value of the property against the log of the BET of the silicas used.

14. The method of claim 12 wherein the parameters p and q are determined by use of an algorithm that minimizes the sum of the squared differences between the values of the observed values of the desired property, y, and the values predicted by the regression equation.

* * * * *